US012665837B2

(12) United States Patent
Gagnon et al.

(10) Patent No.: US 12,665,837 B2
(45) Date of Patent: Jun. 23, 2026

(54) NEGOTIATING MULTI-LINK HIGH RELIABILITY CONNECTION

(71) Applicant: HEWLETT PACKARD ENTERPRISE DEVELOPMENT LP, Spring, TX (US)

(72) Inventors: Jean-Francois Gagnon, St. Laurent (CA); Martin Jolicoeur, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/639,369

(22) Filed: Apr. 18, 2024

(65) Prior Publication Data

US 2025/0330419 A1 Oct. 23, 2025

(51) Int. Cl.
| | |
|---|---|
| *H04L 45/243* | (2022.01) |
| *H04L 43/0864* | (2022.01) |
| *H04L 45/302* | (2022.01) |
| *H04W 28/02* | (2009.01) |
| *H04W 28/16* | (2009.01) |
| *H04W 76/15* | (2018.01) |

(52) U.S. Cl.
CPC ........ *H04L 45/243* (2022.05); *H04L 43/0864* (2013.01); *H04L 45/304* (2013.01); *H04W 28/0236* (2013.01); *H04W 28/16* (2013.01); *H04W 76/15* (2018.02)

(58) Field of Classification Search
CPC . H04L 45/243; H04L 43/0864; H04L 45/304; H04W 28/0236; H04W 28/16; H04W 76/15
See application file for complete search history.

(56) References Cited

U.S. PATENT DOCUMENTS

| | | | | |
|---|---|---|---|---|
| 2021/0274489 A1* | 9/2021 | Fang | ................. | H04W 72/0446 |
| 2023/0147734 A1* | 5/2023 | Sang | .................... | H04W 76/20 |
| | | | | 370/329 |
| 2024/0080138 A1* | 3/2024 | Chang | .................... | H04L 1/203 |
| 2024/0284197 A1* | 8/2024 | Asterjadhi | ............ | H04W 28/18 |

FOREIGN PATENT DOCUMENTS

WO WO-2025005967 A1 * 1/2025 .......... H04W 28/082

OTHER PUBLICATIONS

IEEE 802.11-19/1101r1, "Conditional Packet Duplication in Multiple Link System", Jul. 2019, 10 pages.
IEEE P802.11 Wireless LANs, "IEEE 802.11 Real Time Applications TIG Report", IEEE 802.11-18/2009r6, Nov. 2018, 43 pages.

* cited by examiner

*Primary Examiner* — Austin J Moreau
(74) *Attorney, Agent, or Firm* — Sheppard Mullin Richter & Hampton LLP

(57) ABSTRACT

Systems and methods are provided for implementing a duplication mode of operation that allows for the deliberate duplication of data to be sent between peer multi-link devices (MLDs), thereby overriding a conventional multi-link operation feature. Management frames can be exchanged between the peer MLDs that include information elements comprising one or more bits that can be set to indicate enablement of the duplication mode of operation, as well as conditions under which enablement of the duplication mode of operation occurs.

20 Claims, 8 Drawing Sheets

Figure 3:
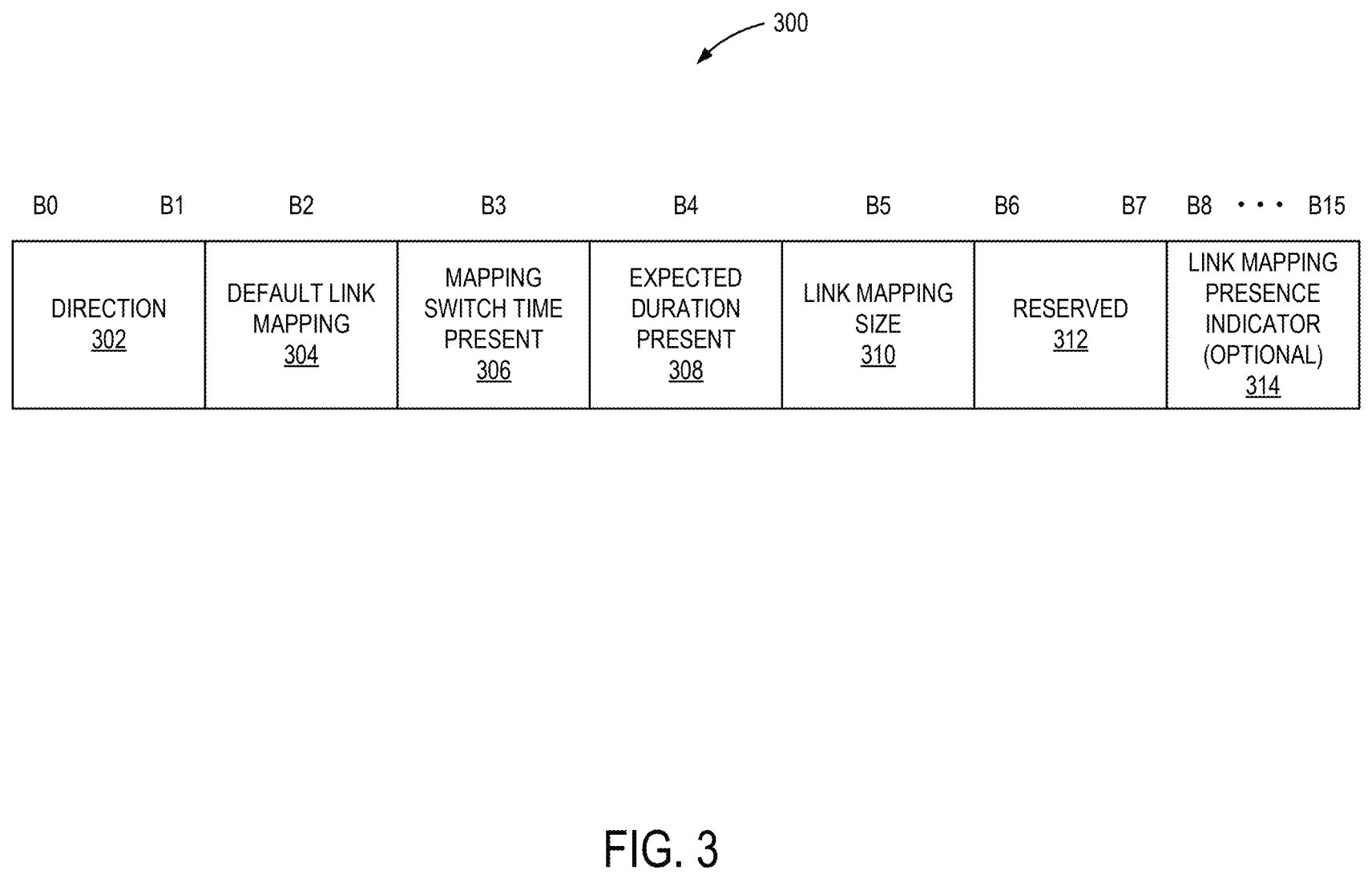

300

| B0 | B1 | B2 | B3 | B4 | B5 | B6 | B7 | B8 · · · · B15 |
|---|---|---|---|---|---|---|---|---|
| DIRECTION 302 | DEFAULT LINK MAPPING 304 | | MAPPING SWITCH TIME PRESENT 306 | EXPECTED DURATION PRESENT 308 | LINK MAPPING SIZE 310 | | RESERVED 312 | LINK MAPPING PRESENCE INDICATOR (OPTIONAL) 314 |

| B0 | B1 – B6 | B7-B31 |
|---|---|---|
| DEFAULT IF UNKNOWN RESERVED OP 532 | OPERATION 534 | OPERATION-DEPENDENT 536 |

— 540

| OP ID | OP NAME |
|---|---|
| 0 | ( |
| 1 | ) |
| 2 | OR |
| 3 | AND |
| 4 | NOT |
| 5 | XOR |
| 6 | PACKET RETRANSMISSION<br>B7: PER PACKET (0) OR PER MINUTE (1)<br>B8-B31: HOW MANY (PACKET RETRIES PER MINUTE/PACKETS PER PACKET RETRIED) |
| 7 | MCS<br>B7-B31: MINIMUM MCS |
| 8 | RSSI<br>B7-B18: MINIMUM RSSI |
| 9 | ROUND TRIP LATENCY:<br>B7-B31: MINIMUM LATENCY (MICROSEC) |
| 10 | RESERVED |
| 11 | RESERVED |
| 12 | RESERVED |
| 13 | RESERVED |
| 14 | RESERVED |
| 15 | RESERVED |

FIG. 5B

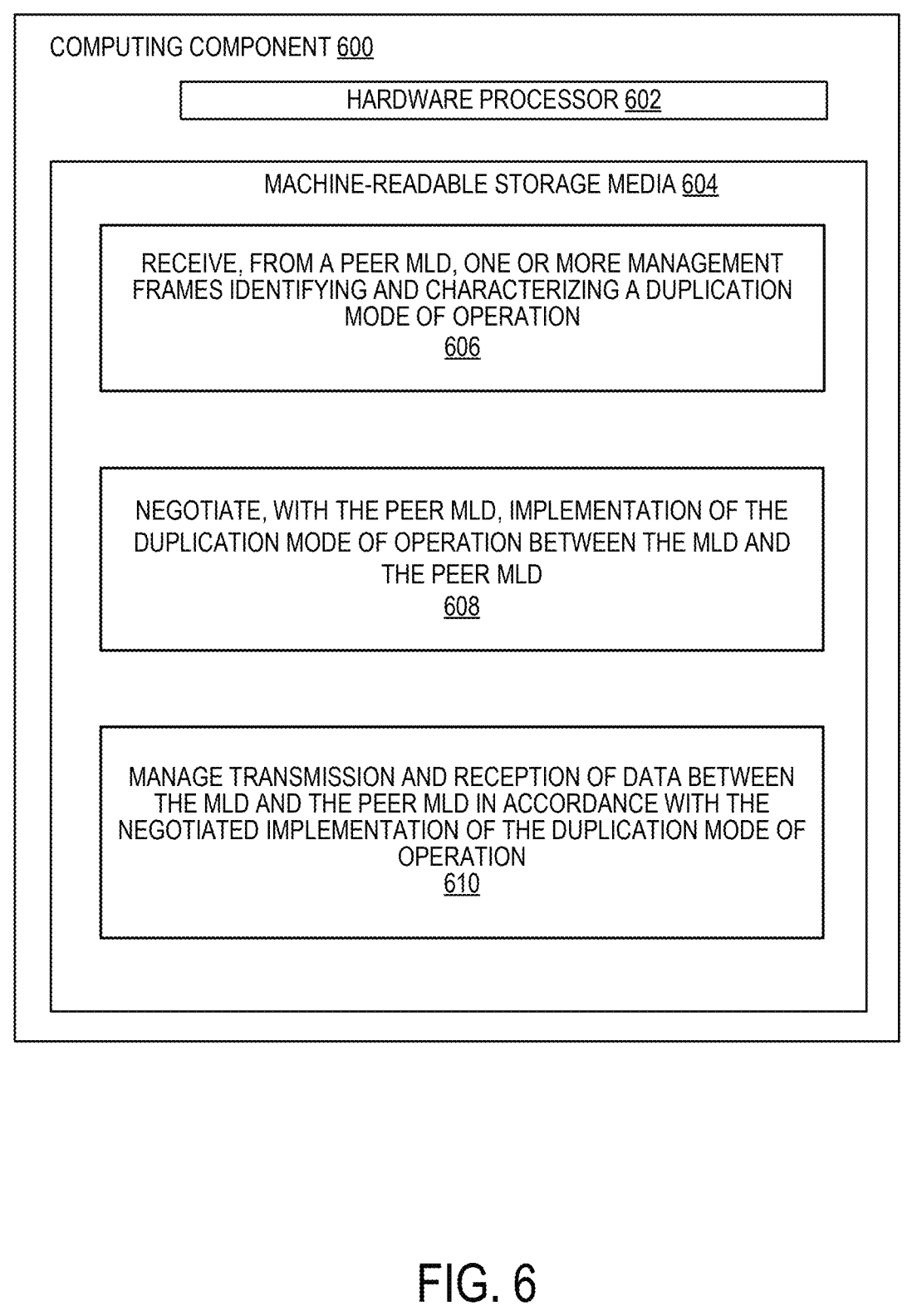

COMPUTING COMPONENT <u>600</u>

HARDWARE PROCESSOR <u>602</u>

MACHINE-READABLE STORAGE MEDIA <u>604</u>

RECEIVE, FROM A PEER MLD, ONE OR MORE MANAGEMENT FRAMES IDENTIFYING AND CHARACTERIZING A DUPLICATION MODE OF OPERATION
<u>606</u>

NEGOTIATE, WITH THE PEER MLD, IMPLEMENTATION OF THE DUPLICATION MODE OF OPERATION BETWEEN THE MLD AND THE PEER MLD
<u>608</u>

MANAGE TRANSMISSION AND RECEPTION OF DATA BETWEEN THE MLD AND THE PEER MLD IN ACCORDANCE WITH THE NEGOTIATED IMPLEMENTATION OF THE DUPLICATION MODE OF OPERATION
<u>610</u>

FIG. 6

NEGOTIATING MULTI-LINK HIGH RELIABILITY CONNECTION

BACKGROUND

The seven-layer Open Systems Interconnection (OSI) model of computer networking includes the physical layer, the data link layer, the network layer, the transport layer, the session layer, the presentation layer, and the application layer. The physical layer is the first and lowest layer, and is the layer most closely associated with the physical connection between devices. The physical layer provides an electrical, mechanical, and procedural interface to the transmission medium. The shapes and properties of the electrical connectors, the frequencies to broadcast on, the line code to use, and similar low-level parameters are specified by the physical layer.

The data link layer is the second layer and is the protocol layer that provides the functional and procedural mechanisms to transfer data between network entities, e.g., nodes on a network segment across the physical layer. The Medium Access Control (MAC) sublayer is the layer that controls the hardware responsible for interaction with the wired, optical, or wireless transmission medium. The MAC sublayer and the Logical Link Control (LLC) sublayer together make up the data link layer. The LLC provides flow control and multiplexing for the logical link, while the MAC provides flow control and multiplexing for the transmission medium.

The Institute of Electrical and Electronics Engineers (IEEE) 802.11 communication standards—more commonly referred to as Wi-Fi®—specify a set of Medium Access Control (MAC) and physical layer (PHY) protocols for implementing/governing wireless local area network (WLAN) computer communications. The IEEE 802.11 protocol denotes a set of interface standards developed by the IEEE 802.11 committee for short-range communications. For example, the devices that implement the IEEE 802.11 protocol may have both 2.4 GHz and 5 GHz radios for transmitting and receiving data and management frames between devices with similar radio configurations. The IEEE 802.11 standards are commonly used today in their 802.11a, 802.11b, 802.11g, 802.11n, and 802.11ac versions to provide wireless connectivity in the home, office, and some commercial establishments.

Wi-Fi 7 (IEEE 802.11be) is the successor to Wi-Fi 6/6E (IEEE 802.11ax) and promises to significantly boost the speed and stability of wireless connections while offering lower latency and the ability to seamlessly manage more connections than prior.

MLO (Multi-Link Operation) is a MAC feature introduced in Wi-Fi 7. MLO enables devices to simultaneously send and receive data across different frequency bands and channels, such as a 2.4 GHz band, a 5 GHz band, and a 6 GHz band. More specifically, MLO is a particular feature of the IEEE 802.11be Extremely High Throughput (EHT) Wi-Fi 7 standard that allows network devices, like access points (APs) and client devices, the ability to transmit and receive data from the same traffic flow over multiple radio channels. For example, a first network device (e.g., the AP) may implement multiple radios, like a 2.4 GHz radio and 5 GHz radio, and each of these radios may communicate with a similar or overlapping frequency radios on a second network device (e.g., the client device). Accordingly, multi-link devices (MLDs) may communicate with one another using multiple links (e.g., 2.4 GHZ, 5 GHZ, 6 GHZ).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates an example information element with which implementation of a duplication mode of operation can be negotiated in accordance with examples of the disclosed technology.

FIG. 5B illustrates another example conditions-specific information element with which implementation of a duplication mode of operation can be negotiated in accordance with examples of the disclosed technology.

FIG. 6 is an example computing component that may be used to implement various features of transmitting a group of packets from a network device or AP to at least one station among a plurality of subscribing stations, according to an example of the present disclosure.

Figure 1:
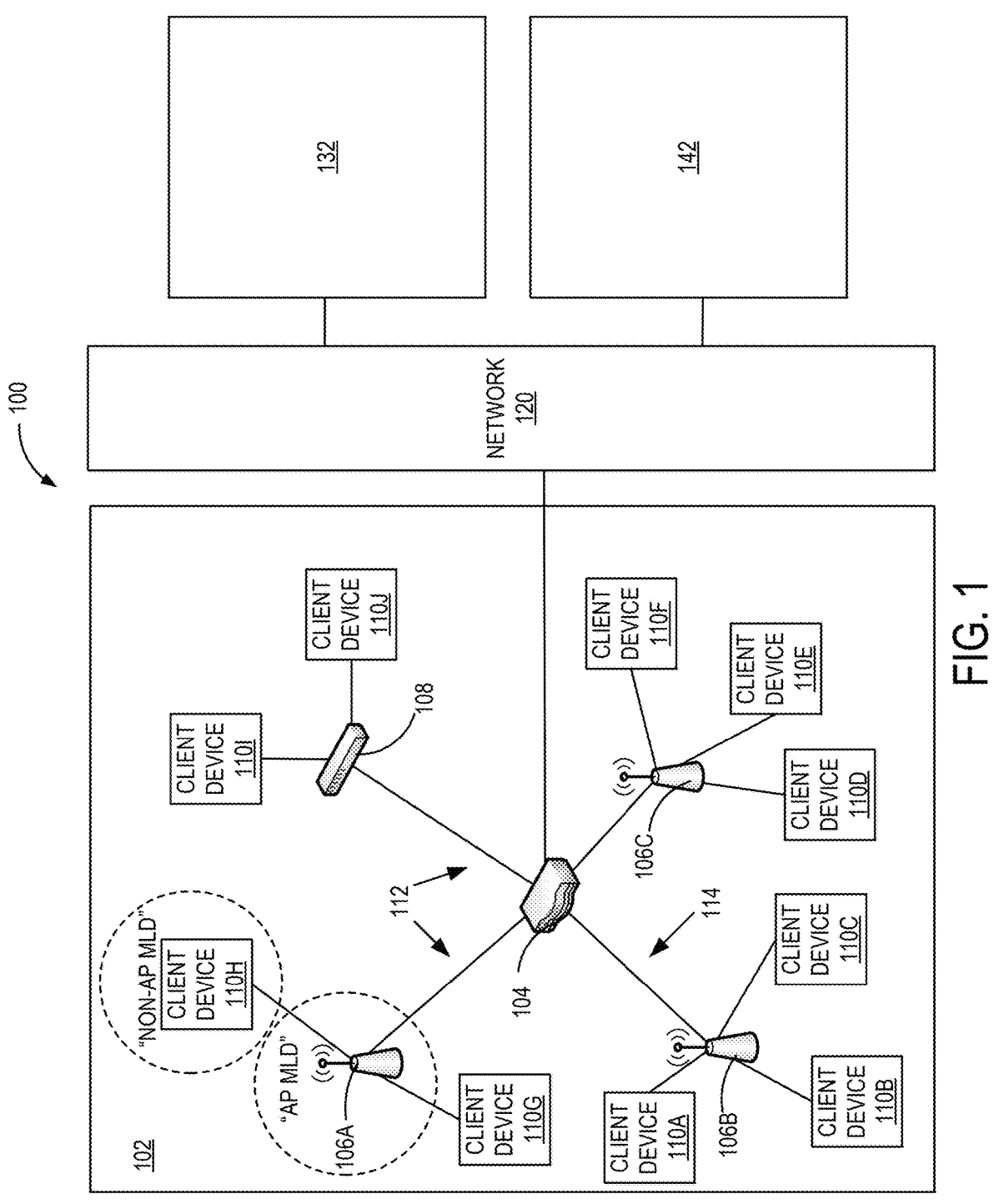
FIG. 1 illustrates one example of a network configuration that may be implemented for an organization, such as a business, educational institution, governmental entity, healthcare facility or other organization in which examples of the disclosed technology may be implemented.

The figures are not exhaustive and do not limit the present disclosure to the precise form disclosed.

DETAILED DESCRIPTION

Examples of the present disclosure provide systems and methods for negotiating the triggering or initiation of a duplication mode in WiFi-7 (or other communications or networking context) using Multi-Link Operation (MLO). It should be noted that although examples are described in the context of WiFi-7 and MLO, examples of the present disclosure can be used or applied in other communications or networking contexts or environments where MLO or other, similar mechanisms or functionality are implemented to allow network entities to receive data packets (or data in general) on more than one band or channel or link. For example, an Integrated Services Digital Network (ISDN) system also has multi-link support over multiple channels of different speeds, a scenario for which the disclosed technology can be beneficial as well.

Wi-Fi 7 introduces MLO support, meaning a given station (STA) or client device may be able to receive (packets or data) on more than one band. For example, an access point (AP) Multi-Link Device (MLD) may communicate with a non-AP MLD (e.g., a client device) over multiple links spanning different frequencies. However, certain limitations or constraints exist with conventional implementation of MLO.

As currently implemented, MLO in Wi-Fi-7 allows network entities or devices to communicate over more than one link/frequency band (e.g., 6 GHZ, 5 GHZ, 2.4 GHz). MLDs may transmit data packets on a first link, while receiving data packets on a second link. Alternatively, MLDs may transmit data packets in one direction, the uplink or downlink direction, while receiving data packets in the other direction. Alternatively still, MLDs may transmit (or receive) different data packets of the same L2 session over more than one link simultaneously. This functionality allows devices to communicate simultaneously or concurrently over multiple connections/using multiple channels/bands resulting in increased throughput, lower latency, etc. However, given this functionality, the possibility exists of duplicate data packets being transmitted/received. Thus, the 802.11be specification, requires a WiFi-7 MLD to implement a duplicate detection mechanism on the receiver side. In this way, if the same data packet(s) is/are received over different links of the same MLD connection, a first-received packet/data is accepted, while any later-received duplicate packets/data are discarded or dropped. In other words, the 802.11be specification treats such duplicate transmissions as an "error condition" to be rectified.

As noted above, examples of the disclosed technology are directed to providing the ability to negotiate MLO parameters that govern how MLO is to be implemented/effectuated between at least two MLD peers. That is, implementations of the disclosed examples override the default MLO behavior of limiting the transmission of duplicate data/packets, and instead, allow for an AP MLD and a non-AP MLD to negotiate the deliberate transmission of duplicate data packets, for example, over more than or all links under certain conditions to increase connection reliability. Accordingly, examples of the disclosed technology allow or provide MLDs the ability to negotiate when/under what condition(s) a packet/data duplication mode is to be initiated, as well as notifying an MLD's peer that it will send duplicate packets/data, and for which type of traffic. Conversely, an MLD device may also now have the ability to notify its peer that it denies deliberate duplicate packets/data.

In particular, reserved bits of an information element (IE), such as the TID-To-Link Mapping Control Field IE, can be used to: (1) identify a duplication mode and advertise duplication mode capabilities for each link (identified by its traffic ID (TID)) and direction (uplink/downlink); and (2) identify a conditional mode where the duplication mode is triggered only when the failed transmission of a data packet from a first MLD link meets/exceeds an excessive transmission retry limit or threshold. In some examples, other condition-specific-triggers for initiating the duplication mode are contemplated and can be effectuated. For example, a separate (already-existing or newly-created) IE may be used for holding or specifying additional information or conditions regarding how/when to implement the duplication mode. Alternatively still, peer MLD devices may exchange information in a way that specifies such conditions, e.g., the peer MLD devices may exchange such information in IEs or other messages/data frames as part of an association negotiation as part of an action-triggering operation that can be effectuated by exchanging action frames, as part of beaconing, etc. (as discussed in greater detail below). Regarding the conditions or triggers themselves, retry thresholds are one example of a triggering condition, but others can be used. For example, the duplication mode of operation can be conditioned on, e.g., the modulation coding scheme (MCS) selected for a particular link, signal strength (in some examples, represented by a received signal strength indicator (RSSI)) exhibited on a link, time of day, and so on. Moreover, initiation of the duplication mode can be triggered by multiple conditions or alternative conditions. Examples of the disclosed technology are not limited to particular conditions or triggers, and can be adapted to initiate the duplication mode based on any conditions or triggers a user/network deems appropriate.

Technical improvements are realized throughout the present disclosure. In one example, the present disclosure provides a method for an AP (or other device) to selectively initiate or enable a duplication mode. When, e.g., a client device attempts to associate to an AP, the client device and AP can negotiate or make determinations regarding how/when to implement a duplication mode. That is, upon attempting to associate to an AP, an MLD, via the aforementioned IE, can be made aware of conditions or parameters that trigger or that should be considered before triggering a duplication mode vis-à-vis advertising or otherwise providing information regarding such conditions/parameters. For example, in an enterprise setting, such as a hospital, it may be critical for data packets, voice packets, etc. to reach a destination. Accordingly, communications resiliency may be of import, and resiliency may be improved (or maintained at a desired level) by leveraging MLO. Again, and as explained above, MLO, per the standard set forth in, e.g., the 802.11be specification, allows for MLDs to transmit/receive data across/over multiple links, but treats duplicate data packet transmission/receipt as an error condition to be avoided. Hence, the ability to override default MLO implementation, and permit duplicate data packets to be transmitted/received may increase the chances that the data packet(s) at issue will reach a target destination device or network entity. However, the duplication of data packets can result in increased latency. Thus, it may be desirable to initiate data packet duplication only in certain circumstances or in response to certain conditions, in other words, implementing the contemplated duplication mode conditionally. For example, it may be desirable to initiate duplicate data packet transmission only if a certain (threshold) number of transmission (or reception) failures occurs. Examples of the present disclosure may be used to allow APs and client devices to negotiate how/when to implement a duplication mode of operation.

It is noted that currently, Wi-Fi 7 is designed to offer communication over three bands (2.4 GHz, 5 GHZ, 6 GHZ). However the present disclosure is not limited to only three bands, as more bands could be added in the future. Furthermore, in a scenario in which multi-link capability supports WiFi+5G connectivity, or any other type of connectivity, the disclosed technology can apply to those scenarios/communications as well.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, the primary site 102 includes a controller 104, which is in communication with the network 120. The controller 104 may provide communication with the network 120 for the primary site 102. There may be other points of communication with the network 120 for the primary site 102 in addition to controller 104. Although single controller 104 is illustrated, the primary site 102 may include multiple controllers and/or multiple communication points with network 120, any combination of which may be MLDs. In some embodiments, the controller 104 may communicate with the network 120 through a router, which may also be an MLD capable of multi-link tunnel communications that are compliant with the IEEE 802.11 standard. In other embodiments, the controller 104 provides router functionality to the devices in the primary site 102. In this specification, the word "tunnel" refers to an encapsulated mode of transporting data between AP and controller.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an Access Point (AP). The controller 104 may be or may include an MLD, which may be capable of multi-link tunnel communications compliant with the IEEE 802.11 standard.

The controller 104 may be in communication with one or more switches 108 and/or wireless Access Points (APs) 106*a-c*. Wireless APs 106*a-c* and switches 108 may also be MLDs that are capable of multi-link tunnel communications and are compliant with the IEEE 802.11 standard. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120. Client devices 110*a-j* may also be able to leverage MLO, and accordingly, may be non-AP MLDs.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired or wireless 112 connection. In the illustrated example, the switch 108 communicates with the controller 104 over a wired or wireless 112 connection.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the example of FIG. 1, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be a satellite office, another floor or suite in a building, for example.

In various embodiments, the network configuration 100 may include one or more smaller remote sites 142, by which various client devices (not shown) access the network 120. Such a remote site 142 may represent, for example, an individual employee's home or a temporary remote office. The remote site 142 may also be in communication with the primary site 102, such that the client devices at the remote site 142 access network resources at the primary site 102 as if these client devices were located at the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The client devices 110*a j*, (and those not shown) may request and access, or transmit and receive data or content. The portions of network 120 and/or the individual sites 102, 132, 142, may utilize dynamic frequency selection (DFS) channels for communication. As an example, communication over a secure tunnel may exist between controller 104 and AP 106*a-c*. Having multi-link communications increase the throughput.

Referring back to the hospital scenario, network configuration 100 may be implemented in a hospital, where client devices 110*a-j* may be Wi-Fi-enabled cellular phones. As noted above, when client devices/APs are able to communicate or establish communications using multiple links or bands, throughput increases, and increased resiliency results. That is, the exchange of data between clients or between a client and an AP can be better ensured if the data is duplicated for transmission/receipt over multiple links. However, as also noted above, to do so continuously/all the time over all links, or even depending on link quality, latency is negatively impacted. That is, duplicating transmissions increases the amount of time needed to effectuate communications because each AP/client device must transmit/receive data packets. Moreover, there is currently no way for an AP MLD or a non-AP MLD (such as a client device) to let its peer (e.g., a device or entity with which it is communicating) know that it will be deliberately sending duplicate data/data packets. There is also no way, currently, for an AP-MLD or a non-AP MLD to specify for what TID/traffic type and/or to notify a peer that it denies deliberate duplicate packets on the receiving side. Moreover, there is currently no mechanism with which to specify those conditions under which a duplication mode of operation should start.

Figures 2A, 2B:
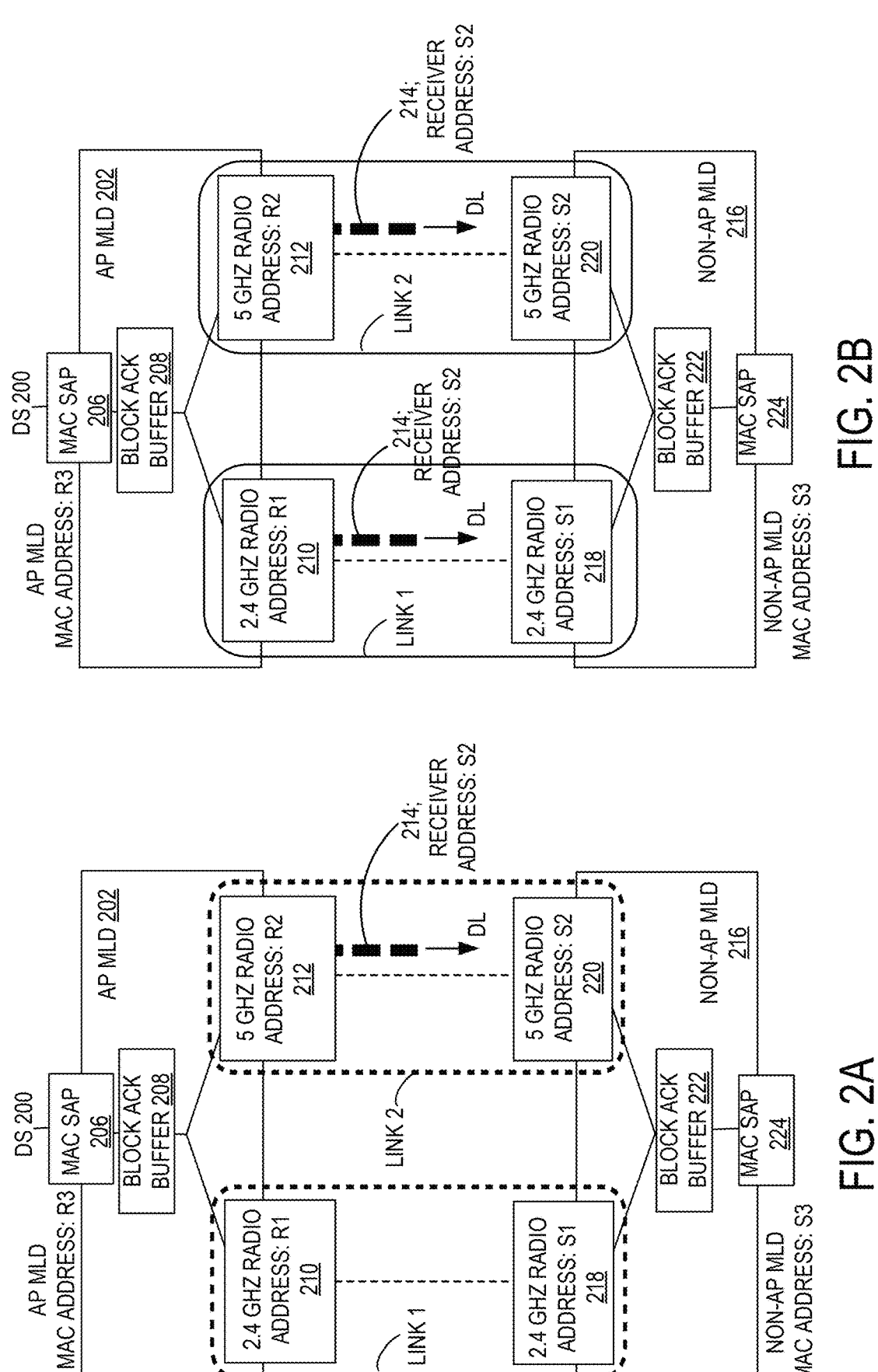
FIG. 2A illustrates an example multi-link device (MLD) communication.
FIG. 2B illustrates an example MLD communication using a duplication mode of operation in accordance with examples of the disclosed technology, contrasted with FIG. 2A.

FIG. 2A illustrates a typical MLD communication 200. In FIG. 2A, a message comes from a distribution system (DS) 200, such as a network, to an access point, AP MLD 202. In FIG. 2A, a message from DS 200 arrives at AP MLD 202, via the media access control layer-service access point (MAC-SAP) 206 and waits in a queue in block ack (BA) buffer 208 to be sent to Non-AP MLD 216. The message is sent via either Link 1 or Link 2. During multi-link operations (MLO), multiple 802.11 devices with multiple radios may operate simultaneously on multiple channels, which may carry multiple frequencies (e.g., 2.4 GHZ, 5 GHZ, 6 GHz or other frequencies). Frames from a single traffic session can be sent on multiple links using the first available link (Link 1 or Link 2). Each link may be a unique wireless channel (as defined in the 802.11 standard). If the message is sent via Link 1, the message is sent from address R1 across interface 210 to address S1 across interface 218. If the message (e.g., frame 214) is sent via Link 2, the message travels from address R2 across interface 212 to address S2 across interface 220. Whether the message arrives via interface 218 or 220, the message waits in a queue at BA buffer 222, to be sent to DS 200, via MAC SAP 224. MLO allows a non-AP MLD 216 to send/receive data to/from AP MLD 202 over multiple links (Link 1 and Link 2). In the example of FIG. 2, a non-AP MLD 216 is associated with AP MLD 202 that is sending frames on the downlink (DL) on 'Link 2' in the 5 GHz frequency range.

The MAC SAP component 224, or Media Access Control (MAC) Service Access Point (SAP), may provide an interface for connecting the radios of network devices to a backend system. This interface functionality may include access to control and management functions as a physical or virtual controller of a network device and provide corresponding functionality. For example, the MAC SAP serves as a translator with the network devices and the lower layers of IEEE 802.11 (Wi-Fi) and IEEE 802.3 (Ethernet). MAC SAP component 224 may enable the functionality of an access point to give the network devices access to the wired network.

Sending data from a traffic session using the first available channel (selected from multiple channels) can improve throughput and reduce latency. The MLDs, AP MLD 202 and non-AP MLD 216, may be logical entities defined by the IEEE 802 family of standards to interface multiple MAC/physical layer (MAC/PHY) systems with each other. AP MLD 202 and non-AP MLD 216 may each have a single MAC-SAP (206 and 224) interface to the upper layers, so that the upper layers do not need information about the links on which the MLD is operating. Within the MLD, there may be one or more client devices where each client device may be a MAC-PHY instance operating on a link. To make the operation efficient, authentication may be performed by the MLDs so that the client devices do not need to establish connections separately on each link, and the MLDs can perform a single setup for multiple links.

A collection of frames 214, which may be sent on the downlink (DL), can just as well be sent fully on 'Link 1' or fully on 'Link 2.' Two frames can be transmitted, for example, on both links simultaneously using the two links, one frame per link. This is because both the non-AP MLD 202 and AP MLD 216 share the same buffer for the BA agreement for both the links. The BA agreement may specify the capability of the sender and receiver and the policy for sending messages. In other words, the common buffer for BA agreement allows frames 214 to be sent on either or both Links 1 and 2.

For the AP MLD 202, in addition to radio addresses R1 and R2, address R3 is defined which identifies the AP MLD entity. A similar address is defined for the non-AP MLD, which in this case is client device S3. The MLDs may be any device that has the capability to use the 802.11 be standard, such as a laptop computer, a desktop PC, PDA access point or Wi-Fi phone. The MLD may be fixed, mobile, or portable. The MLD may be a transmitter or receiver, and the MLD may include a media access control (MAC) and physical layer (PHY) interface to the wireless medium (WM). Since the non-AP MLD 216 can send/receive frames over multiple links to/from an AP simultaneously, the throughput of the non-AP MLD 216 is higher than if were there only one link available.

As noted above, typically, messages/frames would be sent on either Link 1 or Link 2, but if the same messages/frames are transmitted on both Link 1 and Link 2 from AP MLD 202, non-AP MLD 216 would, after receipt of a first instance of the messages/frames, delete any subsequent instances of the messages/frames that it may receive. In contrast to this typical MLD communication 200, examples of the disclosed technology allow for the use of a duplication mode, where data packets are deliberately duplicated to, e.g., increase throughput and resiliency. Thus, AP MLD 202 and non-AP MLD 216 could negotiate between themselves, the use of a duplication mode that would override the deduplication measures set forth in the standard.

As illustrated in FIG. 2B, the same message, after duplication mode negotiation (described herein) may be sent via Link 1, where the message is sent from address R1 across interface 210 to address S1 across interface 218, and via Link 2, where the message travels from address R2 across interface 212 to address S2 across interface 220. Examples of the disclosed technology would override the typical MLO standard-based response to deduplicate a second-received one of the messages received on Links 1 or 2, and permit this simultaneous use of Links 1 and 2 to transmit deliberately duplicated messages.

FIG. 3 illustrates an example IE that can be leveraged to allow for a duplication mode negotiation between MLD peers. In various scenarios, an AP may be operating on an unlicensed or unregulated portion of the wireless spectrum. In such unregulated portions of the wireless spectrum, any wireless device, if capable, can operate on such unregulated portions of the wireless spectrum. While Wi-Fi-compliant devices, may have the requisite intelligence to share bandwidth, yield to certain traffic, etc., other devices may not. Accordingly, as discussed, a duplicate mode, whereby packets are transmitted over all links, all the time, or conditionally depending on, e.g., link quality, may be implemented. As also discussed, there are currently no mechanisms that allow for an MLD (whether an AP MLD or a non-AP MLD) to let its peer know that it will be deliberately transmitting duplicate packets, nor that allow for the peer to let the MLD know it denies deliberate duplicate packets, or under which conditions such a duplication mode should be initiated.

As illustrated in FIG. 3, a TID-to-link Mapping Control Field IE 300 may comprise various parameters, values, or other data/information. For example, bits B0 and B1 may be used to signify or denote a direction of communication subfield 302 (UL/DL) applicable to the parameters, conditions, etc. (the TID-to-link mapping) set forth in IE 300. It should be understood that the TID-to-link mapping associates or maps a TID(s) (indicating type of packet/traffic) to a link(s). IE 300 may further comprise a bit B2 representative of a default link mapping subfield 304, as well as a bit B3 representative of a mapping switch time present subfield 306, and a bit B4 representative of an expected duration present subfield 308. Default link mapping subfield 304 may include a binary indication setting forth whether or not the TID-to-link Mapping Control Field IE 300 represents the default TID-to-link mapping. Mapping switch time refers to the establishment status of the TID-to-link mapping, i.e., the mapping switch time field is present when the TID-to-link Mapping Control Field IE 300 is transmitted by an AP MLD in a beacon or probe response frame and the indicated TID-to-link mapping is not yet established. Otherwise, it is not present. The absence of the mapping switch time subfield 306 suggests that the indicated TID-to-link mapping is/has already been established.

Expected duration present subfield 308 indicates a duration for which the indicated/proposed TID-to-link mapping is expected to be in effect in units of TUs (time units) when the mapping switch time subfield is not present. Link mapping size subfield 310, represented by a bit B5, may be a binary indication setting forth whether the length of the link mapping is 1 octet or 2 octets. Link mapping presence indicator subfield 314 may include bits B8-B15, and may be used to represent whether or not the link mapping of TID n field (associated with a TID-to-link Mapping Control Field IE that indicates links on which frames belonging to each TID can be exchanged) is present in the TID-to-link Mapping Control Field IE 300.

Reserved subfield 312 may comprise two bits, B6 and B7, which can be leveraged to indicate duplication mode parameters/information relevant to negotiating enablement of the duplication mode of operation. In some examples, the B6 bit may be used to identify a duplication mode. That is, an AP MLD or a non-AP MLD may use the B6 bit to advertise its duplication mode capabilities for each link (i.e., each TID), and direction. In particular, and in accordance with some examples, the B6 bit may be set to 1 or 0 to indicate that the duplication mode is either ON or OFF (or vice-versa). The B6 bit, in conjunction with the direction field 302 (with bits B0 and B1 specifying relevant direction of communication) indicate that when the duplication mode is ON, in what direction of communications the duplication mode is active. In other words, setting the B6 bit ON or to an ON bit value is an indication that the peer device accepts duplicate data packets (when the direction subfield 302 specifies a direction commensurate with the receive direction), or that the device may send duplicate data packets to its peer (when the direction subfield 302 specifies a direction commensurate with the transmit direction). An AP MLD or a non-AP MLD may use bit B7 to identify that the duplication mode is to be enabled or implemented conditionally. For example, the B7 bit may indicate that the duplication mode (enabled by setting of the B6 bit) is to be implemented depending on the existence (or lack) of one or more conditions. It should be noted that in some examples, the B7 bit cannot be set (e.g., where the bit value is 1) unless the B6 bit is set/ON. If the B6 bit is set (e.g., the bit value is 1) indicating that the duplication mode is ON, but the B7 bit is not set, (e.g., the bit value is 0), data packets will always be duplicated for a specified TID/direction. In other words, there is no specified condition or trigger indicating when the duplication mode is to be initiated, thus the duplication mode is always on. When the B7 bit is set, a duplication mode triggering condition may include a trigger conditioned on a threshold number (e.g., a max amount or limit) of failed packet transmissions from a first MLD link.

Figure 4:
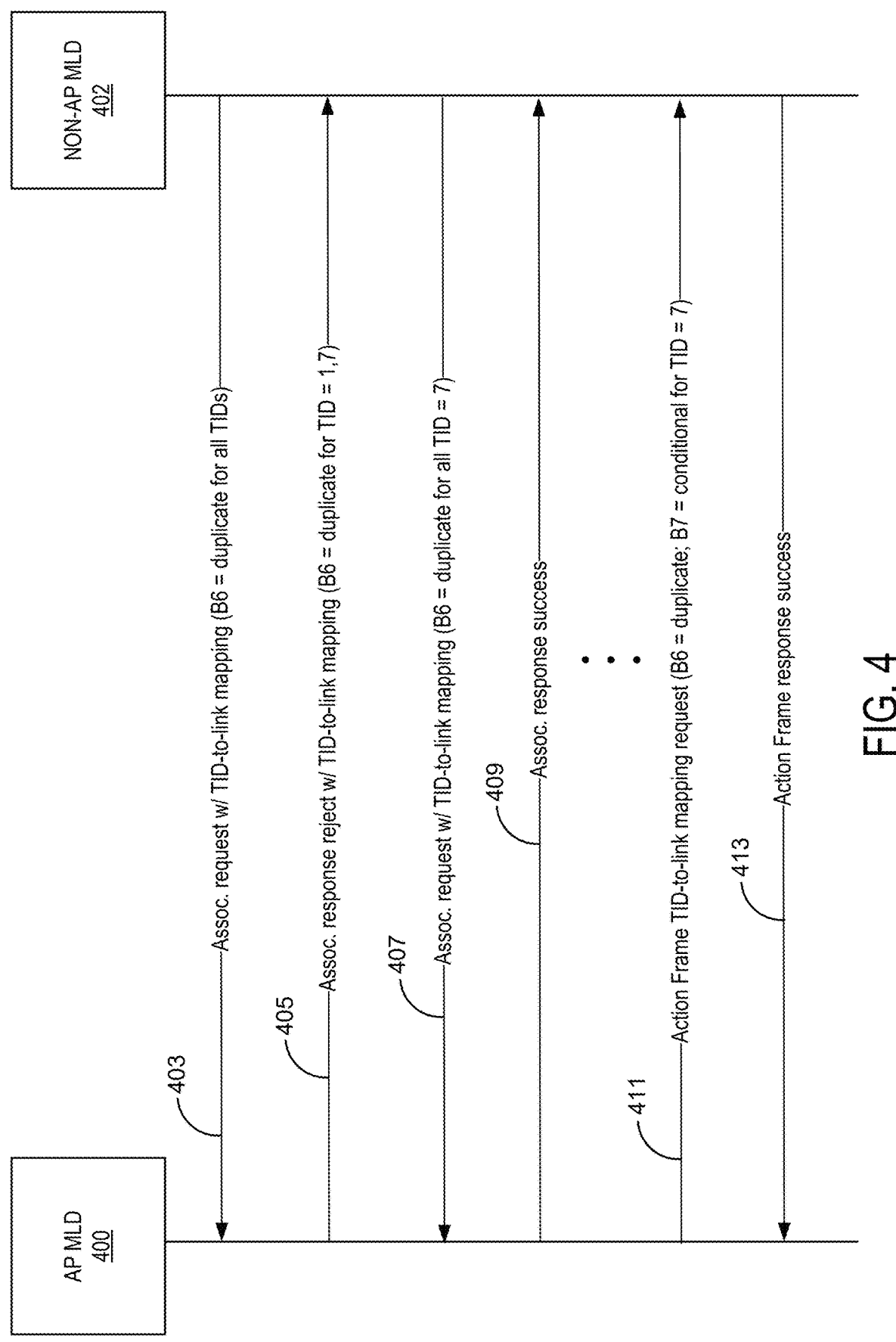
FIG. 4 illustrates an example duplication mode of operation negotiation in accordance with examples of the disclosed technology.

Referring now to FIG. 4, an example duplicate mode negotiation in accordance with one example is illustrated. In this example, non-AP MLD 402 may transmit an association request 403 to AP MLD 400, where a TID-to-Link Mapping Control Field IE (such as IE 300 of FIG. 3) specifies having duplication enabled for all TIDs in the direction of transmission (uplink). AP MLD 400 in this example, denies the association requests by transmitting an association response rejection message 405. The association response rejection 405 may include a TID-to-link Mapping Control Field IE specifying that AP MLD 400 accepts duplication only for TIDs 1 (background data) and 7 (voice). Non-AP MLD 402 may then send an association request 407 with a TID-to-Link Mapping Control Field IE specifying duplication for TID 7 (voice) in the TX direction. The association may be accepted by AP MLD 400, and AP MLD 400 can transmit an association response success message 409.

Later on, or alternatively, AP MLD 400 may send an Action Frame "TID-to-Link Mapping Request" 411 to non-AP MLD 402. The Action Frame "TID-to-Link Mapping Request 411 is transmitted with a TID-to-Link Mapping Control Fields IE specifying that duplication is/should be enabled only conditionally for the same TID 7 (always in the transmit direction). In response, non-AP MLD 413 may answer by transmitting an Action Frame "TID-to-Link Mapping Response" frame for success 413 (if successful), otherwise an Action frame response indicating a failure/rejection of the TID-to-Link mapping, or a suggestion for a preferred TID-to-Link mapping. It should be noted that the negotiations described herein are not necessarily limited to action frames and association/reassociation (referred to commonly as (re) association) negotiations, but may also include negotiation initiated by, e.g., non-AP MLDs performing (re) association triggered by beacons or probe responses from an AP MLD.

Utilization of the duplication mode may be conditioned in various ways/based on various factors, and there may be various ways to define those conditions, and set forth those various factors. From a standards perspective, this conditionality can be left to implementers of the standard.

For example, although examples of the present disclosure are described as utilizing reserved bits of the TID-to-link mapping control field IE 300, using such reserved bits is optional The introduction of such duplication mode negotiation-relevant information or parameters may be set forth in other IEs or other IE fields/subfields that were/are used (currently, or could be used in the future) to exchange information between MLDs or other peer devices.

Figure 5A:
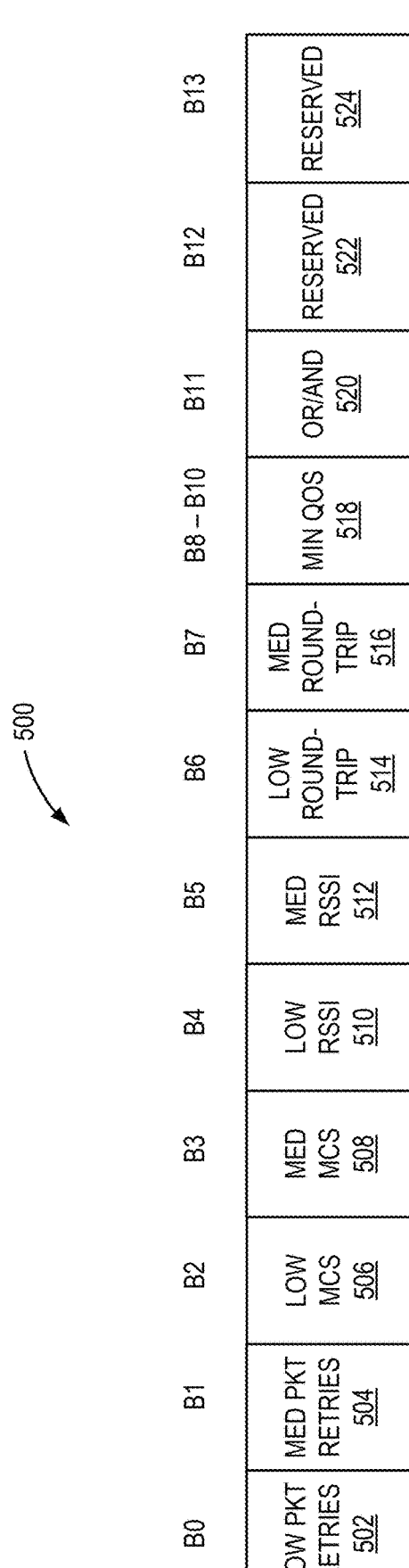
FIG. 5A illustrates an example conditions-specific information element with which implementation of a duplication mode of operation can be negotiated in accordance with examples of the disclosed technology.

FIG. 5A illustrates one such example, alternative IE 500. IE 500 may be a conditions-specific IE that can comprise various requirements or conditions upon which the duplication mode may depend. Similar to IE 300 (FIG. 3), IE 500 may be included as part of association requests/response, action frames, beacons, etc. IE 500, unlike IE 300, however, may comprise only duplication mode conditions. For example, and as illustrated in FIG. 5A, IE 500 includes fourteen bits as follows: B0 corresponds to low packet retries bit 502; B1 corresponds to medium packet retries bit 504; B2 corresponds to low MCS bit 506; B3 corresponds to medium MCS bit 508; B4 corresponds to low RSSI bit 510; B5 corresponds to medium RSSI bit 512; B6 corresponds to low roundtrip time bit 514; B7 corresponds to medium roundtrip time bit 516; B8-B10 corresponds to minimum quality of service (QOS) 518; B11 corresponds to a logic operator (OR/AND) 520; and B12/B13 may be reserved bits 522 and 524, respectively. It should be noted that in this example, setting the low and medium bits (to 1) may correspond to a "high" level of packet retries, MCS, RSSI, or roundtrip time. It should be noted that "low," "medium," and "high" in this example can set or interpreted as needed or desired for a particular system/network, or set of MLDs or other peer devices, traffic, etc. as would be understood by those of ordinary skill in the art. It should also be noted that B8-B10 bits 518 can be used to represent a minimum QoS condition. For example, the 802.11 standards use a three-bit sequence to signify a QoS condition, e.g., 000 may indicate best effort QoS, while 111 may indicate voice communications QoS, and so on. In one example, the minimum QoS may be voice communications, so setting bits B8-B10 to 111 indicates that for any communications whose QoS (or priority) is less than voice/111, duplication is not allowed.

For example, in order to require the existence of high RSSI, e.g., at a non-AP MLD, before initiating the duplication mode of operation, B4 bit 510 and B5 bit 512 are set to 1 (indicating a high RSSI requirement). With these bits set, an AP MLD may advertise its ability to, e.g., receive deliberately duplicated data packets on at least two links/channels in a beacon that the AP MLD broadcasts. A non-AP MLD, such as a client device may "hear" this beacon, and attempt to associate to that AP MLD as it would like to transmit duplicative data packets. The non-AP MLD may then attempt to associate to the AP MLD, and negotiation may commence similar to that described above/illustrated in FIG. 4.

As noted above, in some instances, initiation of the duplication mode of an MLD may be conditioned on multiple requirements, e.g., high roundtrip time (meaning duplicate data packets may help alleviate the high roundtrip time, but otherwise is not allowed) in addition to a medium level of packet retries. In such an example B11 bit 520 may be utilized as a flag indicating a logic operator. For example, setting the B11 bit 520 to 1 may enact an AND logic operator, while setting the B11 bit 520 to 0 may enact an OR logic operator. Following the above example, if the B11 bit 520 is set, then having either the combination of B6 bit 514 and B5 bit 516 (indicating a high roundtrip time condition) or the B1 bit 504 (indicating a medium level of packet retries condition) will define the requisite condition to initiate the duplication mode.

FIG. 5B presents another example IE 530, comprising a B0 bit 532 that is used (set) when the desired operation (OP) corresponds to a reserved bit, e.g., in the future, a new operation may be introduced, and legacy MLDs need to be supported/cross-compatible. If a legacy MLD receives, e.g., an action frame or beacon comprising an OP that is not recognized by the legacy MLD, the B0 bit 532 may be set. B1-B6 bits 534 may be used to indicate the OP, while B7-B31 bits 536 may be used to indicate OP-dependent conditions, factors, etc. It should be noted that IE 530 is a 4 byte (32 bit) string, where a condition can be formed or represented with a series of these 4 byte strings in accordance with the "definitions" set forth in Table 540. Table 540 defines a variety of operators/operations, syntax, and operation-dependent conditions/factors, and can also include reserved bits/subfields. For example, negotiating the initiation of the duplication mode may entail a configurable condition "formula" (hence the aforementioned logic operators/syntax), bi-directional handshaking between peer MLDs, MLD authentication, re-negotiations, as well as other implementational details that can be the basis of duplication mode access negotiations.

FIG. 6 is an example computing component 600 that may be used to implement various features of transmitting a group of packets from a network device or APs to one or more clients or stations (or vice-versa). The network device or AP may be, for example, APs 106*a-c*, 136, 146 as shown in FIG. 1 or AP 300 as shown in FIG. 3. The stations may be, for example, client devices 110*a-j* as shown in FIG. 1. Of course, these are just examples and the present disclosure is not limited thereto.

Computing component 600 may be, for example, a server computer, a controller, or any other similar computing component capable of processing data. Computing component 600 may be resident on/in an AP or a client device, controller, or other similar computing component. In the example implementation of FIG. 6, the computing component 600 includes a hardware processor 602 and machine-readable storage medium 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-610, to control processes or operations for implementing the various features of FIG. 6. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EE-PROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-610.

Hardware processor 602 may execute instruction 606 to receive, from a peer MLD, one or more management frames identifying and characterizing a duplication more of operation. As described above, link mapping negotiations may involve the exchange or advertising of information/values indicating of a duplication mode according to which an MLD may operate. In accordance with one example, bits of a TID-to-link Mapping Control Field IE may be used to indicate or represent whether an MLD is operating in a duplication mode and/or in which direction (UL or DL) the duplication mode applies. The reserved bits may also be used to indicate that enablement of the duplication mode is conditional. For example, a condition may be some threshold number or amount of packet transmission failures, and in accordance with various examples, conditional implementation or enablement of the duplication mode can be expanded to include more conditions/conditions other than link quality. Moreover, the enablement of a duplication mode can be conditioned on more granular factors, e.g., particular thresholds or limits.

Hardware processor 602 may execute instruction 608 to negotiate, with the peer MLD, implementation of the duplication mode of operation between the MLD and the peer MLD. In accordance with various examples, an MLD may be an AP, and its peer MLD may be a client device attempting to attach to the AP. Alternatively, the MLD may be a client device, and the peer MLD may be an AP to which the client device is trying to attach. In still other examples, two APs may negotiate with one another regarding use/implementation of the duplication mode. For example, in a mesh networking context, the APs may comprise mesh portal/point APs (e.g., a mesh point AP may be configured to operate in two roles, that of an AP MLD (to which client devices may connect) and a non-AP MLD when connecting to a portal AP. That is, a first MLD may send a negotiation request, in one example, vis-à-vis a TID-to-link mapping control request which includes the above duplication mode-related parameters or information. A second/peer MLD may send a response back to the first MLD including an acknowledgement or denial of the duplication mode-related parameters/information. As noted above, an MLD may not wish to receive deliberate duplicate data, and can deny a request to enable duplication mode of operation between it and its peer MLD.

Hardware processor 602 may execute instruction 610 to manage the transmission and reception of data between the MLD and the peer MLD in accordance with the negotiated implementation of the duplication mode of operation. That is, if/when the use of a duplication mode can be negotiated (and conditions, if they exist, are met), an MLD and its peer MLD can selectively or dynamically send duplicate packets (when warranted according to the negotiated-upon conditions).

Figure 7:
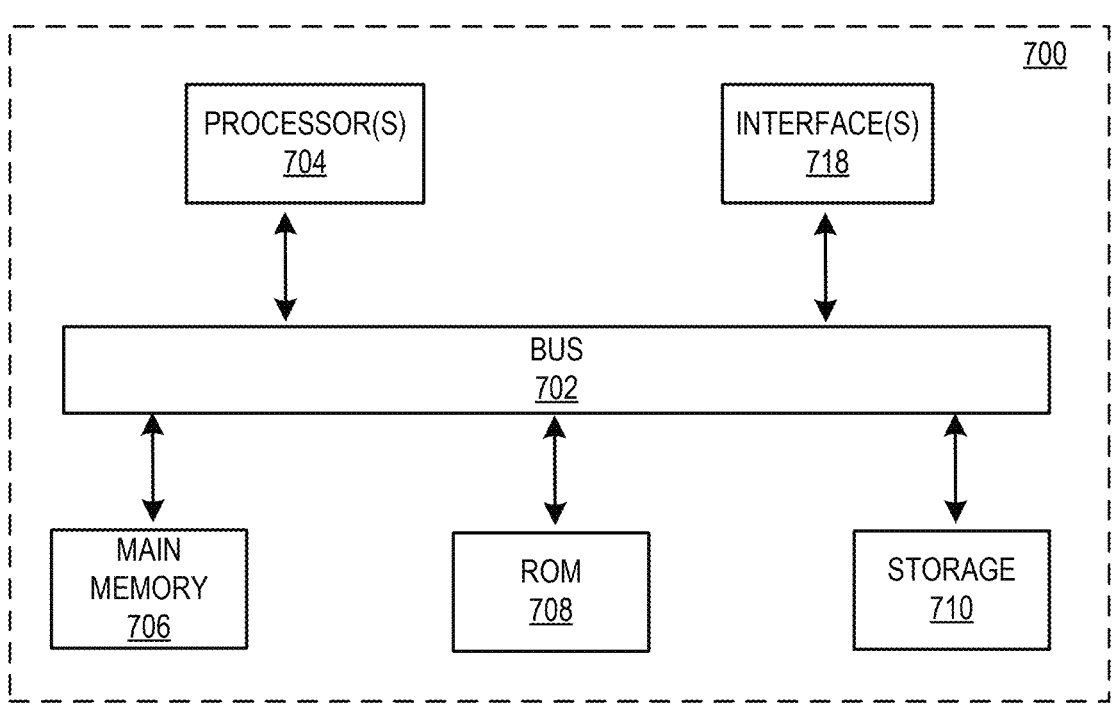
FIG. 7 depicts a block diagram of an example computer system in which various of the embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors. Computer system 700 may be an embodiment of an AP, such as one of APs 106A-C, or a client device, such as one of client devices 110A-J of FIG. 1

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 also includes a communication/network interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media. The computer system 700 can send messages and receive data, including program code, through the network(s), network link and communication interface 718.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A multi-link device (MLD), comprising:
a processor; and
machine-readable storage media comprising instructions, that when executed, cause the processor to:
    receive, from a peer MLD, one or more management frames identifying and characterizing a duplication mode of operation of the peer MLD, wherein the one or more management frames specify a condition-specific information element comprising a set of conditions according to which a use of the duplication mode of operation is premised that comprises at least two of a threshold amount of failed transmission attempts, a threshold modulation coding scheme, a threshold quality of service, a threshold signal strength indication, or a threshold roundtrip latency;
    based on an indication that multiple conditions of the set of conditions have occurred relative to a communication link, negotiate with the peer MLD implementation of the duplication mode of operation between the MLD and the peer MLD; and
    manage transmission and reception of data between the MLD and the peer MLD in accordance with the negotiated implementation of the duplication mode of operation.

2. The MLD of claim 1, wherein the MLD comprises one of an access point (AP) and a non-AP MLD, and wherein the peer MLD comprises an AP.

3. The MLD of claim 1, wherein the one or more management frames comprises at least one of a (re) association request transmitted from the peer MLD, or an action frame requesting a traffic identifier (TID)-to-link mapping.

4. The MLD of claim 3, wherein the negotiation comprises transmitting an indication of success, rejection, or alternative TID-to-link mapping in at least one of a (re) association response, an action frame response, to the peer MLD.

5. The MLD of claim 3, wherein the (re) association request includes a TID-to-link Mapping Control Field information element (IE).

6. The MLD of claim 5, wherein the TID-to-link Mapping Control Field IE comprises a first bit whose set value indicates use or non-use of the duplication mode of operation.

7. The MLD of claim 6, wherein the TID-to-link Mapping Control Field IE comprises a second bit whose set value, in conjunction with the first bit's set value indicating use of the duplication mode of operation, further indicates that the use of the duplication mode of operation is conditional pursuant to the conditions according to which the use of the duplication mode of operation is premised.

8. The MLD of claim 7, wherein the TID-to-link Mapping Control Field IE comprises:
a first set of one or more bits specifying one or more TIDs for which the duplication mode of operation is to be applied; and a second set of one or more bits, different from the first set of the one or more bits, specifying a direction of communication for which the duplication mode of operation is to be applied.

9. The MLD of claim 1, wherein the one or more management frames identifying and characterizing a duplication mode of operation of the peer MLD includes an information element (IE) specifying conditions according to which the duplication mode of operation is implemented.

10. A multi-link device (MLD), comprising:

a processor; and machine-readable storage media comprising instructions, that when executed, cause the processor to:

attempt to associate to a peer MLD;

as part of the attempt to associate to the peer MLD, negotiate with the peer MLD, implementation of a duplication mode of operation between the MLD and the peer MLD, wherein a set conditions according to which a use of the duplication mode of operation is premised comprises at least two of a threshold amount of failed transmission attempts, a threshold modulation coding scheme, a threshold quality of service, a threshold signal strength indication, or a threshold roundtrip latency, the set of conditions being specified in a condition-specific information element of one or more management frames identifying and characterizing the duplication mode of operation received from the peer MLD, wherein implementation of the duplication mode of operation is based on an indication that multiple conditions of the set of conditions have occurred relative to a communication link to the peer MLD; and manage receipt or transmission of data at or from the MLD relative to the peer MLD in accordance with the negotiated implementation of the duplication mode of operation.

11. The MLD of claim 10, wherein the MLD comprises a client device and the peer MLD comprises an access point (AP).

12. The MLD of claim 11, wherein the MLD comprises a first mesh AP, and wherein the peer MLD comprises a second mesh AP.

13. The MLD of claim 10, wherein the instructions that when executed, cause the processor to negotiate with the peer MLD, comprise further instructions causing the processor to transmit a (re) association request to the peer MLD specifying whether or not the duplication mode of operation is to be enabled, and how the duplication mode of operation is to be enabled.

14. The MLD of claim 13, wherein the instructions that when executed, cause the processor to negotiate with the peer MLD, comprise further instructions causing the processor tor receive a (re) association response from the peer MLD specifying a rejection of the association response or an indication of successful association.

15. The MLD of claim 14, wherein the (re) association response from the peer MLD specifying a rejection of the association response further specifies an alternative manner regarding how the duplication mode of operation is to be enabled.

16. The MLD of claim 15, wherein the specification of whether or not the duplication mode of operation is to be enabled, and how the duplication mode of operation is to be enabled is set forth by one of more bit values of a TID-to-link Mapping Control Field information element (IE).

17. The MLD of claim 10, wherein a management frame sent to the peer MLD comprises the multiple conditions of the set of conditions.

18. A multi-link device (MLD), comprising:

a processor; and machine-readable storage media comprising instructions, that when executed, cause the processor to:

transmit an action frame request to a peer MLD specifying a manner of implementing a duplication mode of operation between the MLD and the peer MLD;

negotiate with the peer MLD, the manner of implementing the duplication mode of operation between the MLD and the peer MLD, wherein a set of conditions according to which a use of the duplication mode of operation is premised comprises at least two of a threshold amount of failed transmission attempts, a threshold modulation coding scheme, a threshold quality of service, a threshold signal strength indication, or a threshold roundtrip latency, wherein negotiating with the peer MLD is based on an indication that multiple conditions of the set of conditions have occurred relative to a communication link to the peer MLD, and wherein the set of conditions is specified in a condition-specific information element of the action frame; and in response to receipt of an action frame success response, manage receipt or transmission of data at or from the MLD relative to the peer MLD in accordance with the negotiated implementation of the duplication mode of operation.

19. The MLD of claim 18, wherein the action frame request comprises a TID-to-link Mapping Control Field information element (IE), the action frame request comprising a TID-to-link mapping request.

20. The MLD of claim 19, wherein the manner of implementing a duplication mode of operation between the MLD and the peer MLD includes the conditions under which the duplication mode of operation is to be enabled, and types of traffic for which the duplication mode of operation is to be enabled under the conditions.

* * * * *